US010182615B2

(12) United States Patent
Jacobsen

(10) Patent No.: US 10,182,615 B2
(45) Date of Patent: Jan. 22, 2019

(54) LIGHT-CURED COMPOSITE INSOLE

(71) Applicant: Light Composites, LLC, Woodland Hills, CA (US)

(72) Inventor: Alan Jon Jacobsen, Woodland Hills, CA (US)

(73) Assignee: LIGHT COMPOSITES, LLC, Woodland Hills, CA (US)

( * ) Notice: Subject to any disclaimer, the term of this patent is extended or adjusted under 35 U.S.C. 154(b) by 0 days.

(21) Appl. No.: 15/534,344

(22) PCT Filed: May 15, 2016

(86) PCT No.: PCT/US2016/032617
§ 371 (c)(1),
(2) Date: Jun. 8, 2017

(87) PCT Pub. No.: WO2017/007533
PCT Pub. Date: Jan. 12, 2017

(65) Prior Publication Data
US 2017/0368722 A1 Dec. 28, 2017

Related U.S. Application Data

(60) Provisional application No. 62/189,100, filed on Jul. 6, 2015.

(51) Int. Cl.
B29C 35/08 (2006.01)
A43B 17/00 (2006.01)
(Continued)

(52) U.S. Cl.
CPC ............ A43B 17/003 (2013.01); A43B 7/141 (2013.01); A43B 7/28 (2013.01); A43B 17/00 (2013.01);
(Continued)

(58) Field of Classification Search
CPC .. A43B 7/141; A43B 7/14; A43B 7/20; A43B 7/28; A43B 17/006; A43B 17/14; B29C 35/0805; B29C 35/0888
See application file for complete search history.

(56) References Cited

U.S. PATENT DOCUMENTS 3,905,376 A * 9/1975 Johnson ............... A43B 1/0036
264/222
4,450,122 A 5/1984 Gallina
(Continued)

OTHER PUBLICATIONS

International Search Report and the Written Opinion of the International Searching Authority for PCT/US2016/032617; dated Aug. 16, 2016.

Primary Examiner — Jila M Mohandesi
(74) Attorney, Agent, or Firm — Tope-McKay & Associates

(57) ABSTRACT

The present invention describes a shaped footwear device intended to be used as a supportive insole or orthotic and a system and methods for making the same. The footwear device includes a top foam layer, a light-cured composite material layer, and a bottom textile layer. The footwear device is created by conforming a pre-cured insole assembly to the plantar surface of a foot or foot mold and then exposing the pre-cured insole assembly to light to create a shaped footwear device with a light-cured composite material support plate.

15 Claims, 13 Drawing Sheets

(51) Int. Cl.
*A43B 17/14* (2006.01)
*B29D 35/08* (2010.01)
*A43B 7/28* (2006.01)
*A43B 7/14* (2006.01)
*B32B 5/02* (2006.01)
*B32B 5/18* (2006.01)
*B32B 27/06* (2006.01)
*B32B 27/32* (2006.01)
*B32B 27/36* (2006.01)
*B29L 31/50* (2006.01)
*B29K 23/00* (2006.01)
*B29K 67/00* (2006.01)
*B29K 105/04* (2006.01)
*B29K 105/08* (2006.01)
*B29C 35/02* (2006.01)

(52) U.S. Cl.
CPC ............ *A43B 17/006* (2013.01); *A43B 17/14* (2013.01); *B29C 35/0805* (2013.01); *B29C 35/0888* (2013.01); *B29D 35/08* (2013.01); *B32B 5/024* (2013.01); *B32B 5/18* (2013.01); *B32B 27/065* (2013.01); *B32B 27/32* (2013.01); *B32B 27/36* (2013.01); *B29C 35/02* (2013.01); *B29C 2035/0827* (2013.01); *B29K 2023/0625* (2013.01); *B29K 2067/00* (2013.01); *B29K 2105/04* (2013.01); *B29K 2105/08* (2013.01); *B29K 2995/0069* (2013.01); *B29L 2031/507* (2013.01); *B32B 2262/0276* (2013.01); *B32B 2307/7265* (2013.01); *B32B 2437/02* (2013.01)

(56) References Cited

U.S. PATENT DOCUMENTS

| | | |
|---|---|---|
| 4,716,662 A | 1/1988 | Bar |
| 4,765,411 A | 8/1988 | Tennant |
| 5,387,384 A | 2/1995 | Irving |
| 5,555,584 A * | 9/1996 | Moore, III ............... A43B 7/28 12/142 N |
| 5,632,057 A | 5/1997 | Lyden |
| 6,490,730 B1 | 12/2002 | Lyden |
| 6,681,403 B2 | 1/2004 | Lyden |
| 6,939,502 B2 | 9/2005 | Lyden |
| 7,003,803 B1 | 2/2006 | Lyden |
| 2003/0001314 A1 | 1/2003 | Lyden |
| 2010/0011625 A1* | 1/2010 | Percival ............... A43B 17/003 36/3 B |
| 2014/0007456 A1* | 1/2014 | Tadin .................... A43B 13/38 36/43 |
| 2016/0295963 A1* | 10/2016 | Chang .................. B29D 35/142 |

\* cited by examiner

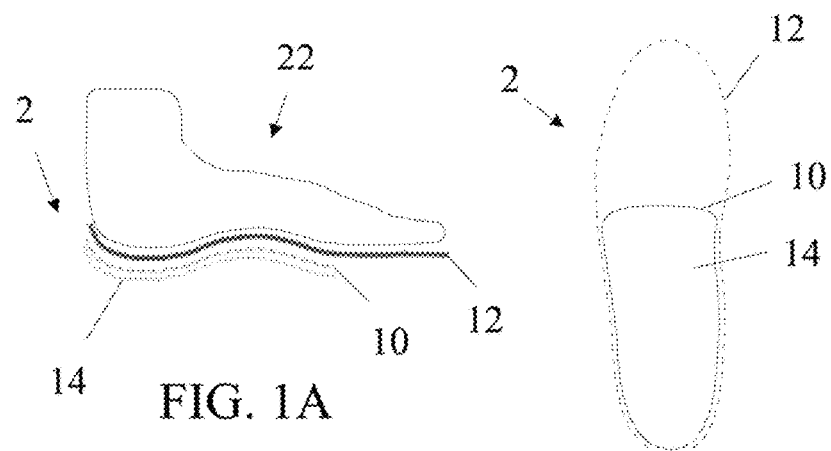
FIG. 1A
FIG. 1B
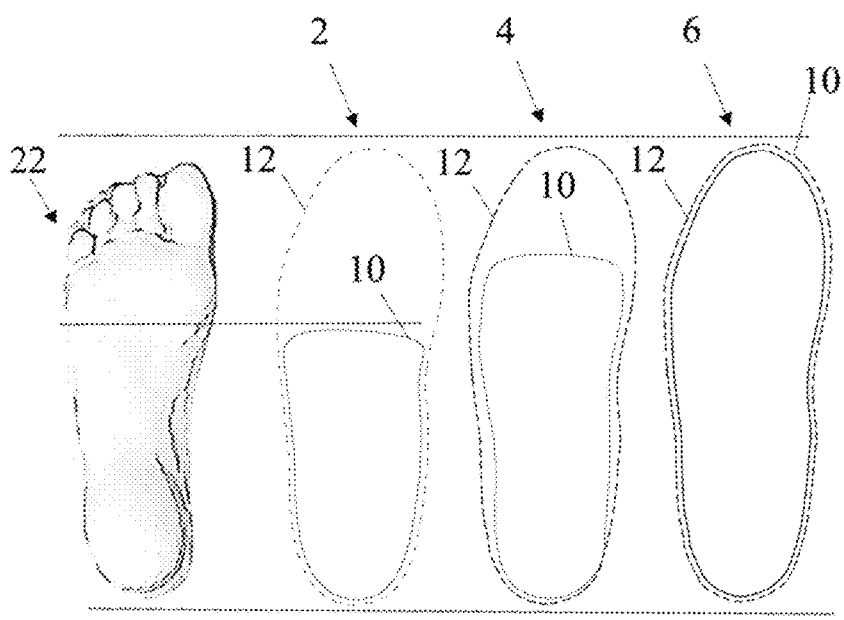
FIG. 2

LIGHT-CURED COMPOSITE INSOLE

CROSS-REFERENCE TO RELATED APPLICATIONS

This application is a national stage filing of PCT/US2016/032617, filed on May 15, 2016, which claims the benefit of U.S. Provisional Application 62/189,100, entitled LIGHT-CURED COMPOSITE INSOLE filed 6 Jul. 2015.

FIELD OF THE INVENTION

The present invention relates to a shaped footwear device and a system and methods for making the same.

BACKGROUND OF THE INVENTION

The present invention describes a footwear device that is intended to be worn inside an article of footwear or be an integral part of an article of footwear. Such devices that are worn inside an article of footwear are commonly referred to as insoles, orthotics, sockliners, footbeds, inserts, or arch supports. For the purposes of this invention, this type of footwear device will be referred to as a supportive performance insole, or insole for brevity.

The said device described by this invention is constructed of a foam layer, a textile layer, and a composite material layer that includes a fiber reinforcement phase and a polymer matrix phase that binds the reinforcement phase together.

In addition, the said footwear device comprises a light-cured polymer matrix that binds the reinforcement phase. Unlike conventional polymer-matrix fiber-reinforced composite materials that utilize a polymer that is thermally cured, a light-curable matrix will cure when exposed to light with a specific wavelength range and sufficient energy, or dosage. Generally the light used to cure light-curable polymer materials is in or near the UV spectrum and the fibers used as the reinforcement phase are glass fibers because of their transparency to UV light.

One advantage of light-cured composite materials is that the time required to polymerize the matrix phase from a liquid monomer to a solid polymer can be much less (seconds to minutes) than the time it takes to thermally cure polymers used in conventional composites (generally hours).

Another advantage of light-curable composite materials is that heat does not need to be applied to the material during the curing cycle, which opens the option for alternative, lower-cost molding materials to shape the composite that could not survive or perform their intended function at the elevated temperatures (generally >250 F) and pressures that are required for traditionally thermally-cured composites.

Light-cured composite materials also enable flat foam materials to maintain the desired shape of a performance insole, which generally includes a shaped arch and heel cup. By maintaining the shape of the insole with a light-cured composite supportive layer, it avoids the added cost and complexity of compression or injection molding the foam to create the desired shape of the insole.

Prior art such as U.S. Pat. Nos. 5,632,057 and 6,939,502 by Lyden, describe methods to create light-cured footwear articles; however, this prior art relies on a rigid mold or surface to define the shape of the light-cured article, thus limiting the shape and performance of a composite support plate.

Additional relevant prior art include U.S. Pat. Nos. 6,490,730, 6,681,403, and 7,003,803, also by Lyden. In this prior art, Lyden describes light-cured articles of protective equipment and methods to fabricate the articles directly on the relevant area of the body. However, the described methods in this prior art can be cumbersome and dangerous if the UV-resin gets too hot during curing.

What is needed is an insole device that can take advantage of the performance benefits of fiber-reinforced composite materials without added manufacturing complexity. Insoles constructed of fiber-reinforced composite materials can be stiffer and lighter than other common materials used to construct supportive insoles, such as injection molded plastics. In addition, simpler and safer methods and systems are necessary to efficiently and quickly manufacture high-quality, custom shaped performance insoles directly on a person's foot; particularly methods that offer greater conformability to the foot without having the person in a full weight-bearing position.

SUMMARY OF THE INVENTION

The present invention describes a shaped footwear device intended to be used as a supportive insole and a system and methods for making the same.

In an embodiment of the present invention, a method for making a shaped footwear device involves securing at least a portion of a transparent stretch film substantially taut, wherein the substantially taut portion of the transparent stretch film is secured at or near edges that define at least a portion of its perimeter.

The method further involves placing a pre-cured insole assembly between the taut transparent stretch film and the plantar surface of a foot.

The method further involves pressing the plantar surface of the foot against the pre-cured insole assembly such that at least a portion of the taut transparent stretch film stretches between its secured edges and conforms at least a portion of the pre-cured insole assembly to at least a portion of the plantar surface of the foot.

The method further involves exposing the pre-cured insole assembly to light, wherein the light has sufficient wavelength range and energy to cure the light-curable resin in the pre-cured insole assembly.

The method further involves separating the shaped footwear device from the transparent stretch film and the plantar surface of the foot.

In one embodiment of the method, the pre-cured insole assembly comprises at least one foam layer, at least one pre-cured composite material layer, and at least one textile layer.

In one embodiment of the method, at least a portion of the plantar surface of the foot is pressed at least 25 mm through the plane that is defined by the edges securing the transparent stretch film.

In an embodiment of the present invention, a system for making a shaped footwear device comprises a light box configured to hold a transparent stretch film substantially taut over an opening on one surface of the light box, wherein the transparent stretch film is secured near at least a portion of the edges of the opening on the one surface of the light box.

The system further comprises a pre-cured insole assembly, wherein the pre-cured insole assembly is adapted to fit within the opening on the one surface of the light box.

The system further comprises at least one light source adapted to direct light on at least one surface of the pre-cured insole assembly, wherein the light from the light source is adapted to cure the light-curable resin in the pre-cured insole assembly.

In one embodiment of the system, the maximum elongation to failure of the transparent stretch film is at least 100%.

In one embodiment of the system, the pre-cured insole assembly comprises stacked layers, wherein the stacked layers comprise at least one foam layer, at least one pre-cured composite material layer, and at least one textile layer.

In one embodiment of the system, one surface of the at least one pre-cured composite material layer is adjacent to at least a portion of the at least one foam layer and a second surface of the at least one pre-cured composite material layer is adjacent to at least a portion of the at least one textile layer.

In one embodiment of the pre-cured insole assembly, the stacked layers comprise a polymer film barrier layer between the at least one pre-cured composite material layer and the at least one foam layer.

In one embodiment of the pre-cured insole assembly, the stacked layers comprise a polymer film barrier layer that is adjacent to at least one surface of the at least one textile layer.

In one embodiment of the pre-cured insole assembly, the pre-cured insole assembly comprises a thin, transparent, flexible packaging film around the outer surface of the stacked layers.

In one embodiment of the pre-cured insole assembly, the at least one foam layer is 0.5 mm-6 mm thick.

In one embodiment of the pre-cured insole assembly, the at least one composite material layer comprises at least one layer of continuous glass fibers that are woven, stitched, or knitted.

In one embodiment of the pre-cured insole assembly, the at least one textile layer has greater than 25% transmittance to light within a wavelength range between 370 nm and 410 nm.

In one embodiment of the system, the thickness of the transparent stretch film is between 0.008 mm and 0.05 mm.

In one embodiment of the system, the light box comprises a transparent guide plate secured between the opening on one surface of the light box and the light source, wherein at least a portion of the transparent guide plate is at least 25 mm from the opening on the one surface of the light box.

In one embodiment of the system, the transparent guide plate is adjustable and can be set at different angles and positions within the light box.

In one embodiment of the system, the size of the opening on the one surface of the light box is adjustable.

In one embodiment of the system, the light box includes access windows such that there is access to adjust the position of the foot and pre-cured insole assembly by hand.

In an embodiment of the present invention, a method for making a shaped footwear device involves securing the plantar surface of a foot, and placing a pre-cured insole assembly between the plantar surface of the foot and a transparent stretch film.

The method further involves stretching the transparent stretch film over the pre-cured insole assembly and plantar surface of the foot, and conforming at least a portion of the pre-cured insole assembly to at least a portion of the plantar surface of the foot.

The method further includes exposing the pre-cured insole assembly to light, wherein the light has sufficient wavelength range and energy to cure the light-curable resin in the pre-cured insole assembly.

In one embodiment of the method, the shaped footwear device is separated from the transparent stretch film and the plantar surface of the foot.

In one embodiment of the method, the pre-cured insole assembly comprises at least one foam layer, at least one pre-cured composite material layer, and at least one textile layer.

In one embodiment of the method, one surface of the at least one composite material layer is adjacent to at least a portion of the at least one foam layer and a second surface of the at least one composite material layer is adjacent to at least a portion of the at least one textile layer.

In one embodiment of the method, the at least one textile layer of the pre-cured insole assembly is adjacent to the transparent stretch film.

In one embodiment of the method, the at least one foam layer of the pre-cured insole assembly is adjacent to the plantar surface of the foot.

In one embodiment of the method, the foot is a person's foot.

In one embodiment of the method, the foot is a foot mold representing the shape of the plantar surface of a foot.

BRIEF DESCRIPTION OF THE DRAWINGS

FIG. 1A is a side view cross-section schematic of the foot and the shaped footwear device which includes a top foam layer, a light-cured composite material layer, and a bottom fabric layer.

FIG. 1B is a top view schematic of the outer shape of one embodiment of the shaped footwear device.

FIG. 2 is a schematic of the bottom surface of the foot and representative shapes of three different composite material layers sized for different functionality.

DETAILED DESCRIPTION OF THE INVENTION

Figure 3:
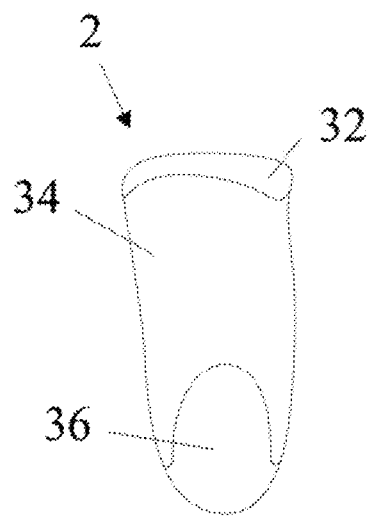
FIG. 3 is a top view schematic for one possible design of the different glass fiber layers that comprise the composite material layer.

The present invention describes a footwear device intended to be used as a supportive performance insole, and a system and methods to make the same. The insole can be a custom footwear device designed to specifically fit an individual's foot, or a mass-produced footwear device based on a generally designed foot shape and size. Methods described in this invention can be used to manufacture the custom insole or the mass-produced insole using a person's foot or foot mold with the desired shape.

Light-cured Composite Performance Insoles

FIG. 1A and FIG. 1B schematically represent different views of the supportive performance insole designed for a foot 22.

In FIG. 1A, the insole 2 is comprised of a light-cured composite material layer 10 that includes at least one layer of continuous glass fibers bonded together by a light-cured polymer matrix. The insole 2 also includes a top foam layer 12 and a bottom textile layer 14 that are bonded together with the same said light-cured polymer matrix.

In some embodiments, it may be preferable to have a thin polymer barrier layer between the top foam layer 12 and the composite material layer 10. The purpose of this thin polymer barrier layer would be to prevent resin in the composite material layer from penetrating into the top foam layer before the resin is cured. An example polymer barrier layer would be a TPU hot melt adhesive film that is bonded to the bottom surface of the top foam. The thickness of the TPU hot melt adhesive film layer could range from 0.005 mm to 1 mm. In this embodiment, the light-cured composite material layer would be bonded to polymer barrier layer, which in turn would be bonded to the top foam layer.

In some embodiments, it may be preferable to have at least one thin polymer barrier layer adjacent to the bottom textile. The thin polymer barrier layer could be adjacent to the top or bottom surface of the bottom textile, or in some cases both. The purpose of this thin polymer barrier layer would be to prevent any contact with the resin in the composite material layer and/or resin that has soaked into the textile layer before curing.

In the preferred embodiment, continuous glass fibers are used as the reinforcement phase and the continuous glass fibers are layered to construct a symmetric laminate in at least a portion of the light-curable material 10. The layers of continuous glass fibers that form the laminate can include unidirectional layers or woven layers, such as plain or satin weaves. Non-symmetric fiber lay-ups are also possible.

Reinforcement fibers other than glass fibers can be used, such as carbon, aramid, or nylon fibers; however, if these other types of fibers are not transparent to the wavelength of light used to cure the light-curable resin, then an extra thermal cure step may be necessary to fully cure the composite part. If non-glass fibers are used as reinforcement fibers in the insole, the preferred lay-up of reinforcement fibers would have at least one layer of transparent fibers (preferably glass) on the top surface of the reinforcement fiber layer 10 to fix the shape of the composite part using a light-cure step.

The top foam layer 12 could be one of many types of foam materials commonly used in footwear, including but not limited to ethylene vinyl acetate (EVA) foam, polyurethane (PU) foam, and polyethylene (PE) foam. The top foam layer 12 can range in thickness from 0.1 mm to 10 mm; however, in the preferred embodiment, the top foam layer 12 would be between 0.5 mm-6 mm. The top foam layer 12 could also be lined with another material that is intended to be in direct contact with the foot during use, such as a polyester textile or leather.

In some embodiments, the textile or leather may be thick enough to be used in place of the top foam layer altogether. The thickness requirement is dependent on comfort and insulating the plantar surface of the foot from the heat generated by the exothermic reaction of the resin when curing.

The bottom textile layer 14 could be made of one of many types of common textile materials, such as polyester, nylon, rayon, or cotton. In the preferred embodiment, the bottom textile layer 14 would be a polyester or polyester blend textile, such as Coolmax® fabric. The main purpose of the bottom textile layer 14 is to hide the glass fibers that comprise the composite material layer 10, which provides a more aesthetically appealing insole.

Although the bottom textile layer 14 provides an aesthetic cover to the composite material layer 10, the bottom textile layer 14 must be sufficiently transparent to the wavelength of light used to cure the light-curable resin, such that it does not prevent curing of the light-curable resin during the exposure step of the process. In one embodiment, the textile layer would have a greater than 20% transmittance to light with a wavelength range between 370 nm and 410 nm. In one embodiment, the textile layer would have a greater than 50% transmittance to light with a wavelength range between 370 nm and 410 nm. The bottom textile layer 14 can be smaller, larger, or the same size as the composite material layer 10. In FIG. 1B, the bottom textile layer 14 is shown as the same size as the composite material layer 10.

The top foam layer 12 and the bottom textile layer 14 are co-cured to the composite material layer 10 with the same light-cured matrix resin in the composite material layer 10, and thus are an integral part of the structural composite that forms the insole 2. The light-cured polymer matrix resin may infiltrate into all or a portion of the top foam layer 12 and bottom textile layer 14.

In embodiments where it is not desirable to have the resin infiltrate into the top foam layer or the bottom textile layer, at least one thin polymer barrier layer can separate the composite material layer from the top foam layer or the bottom textile layer. In these embodiments, the polymer barrier layer would be bonded to the top foam layer or bottom textile layer prior to curing the resin in the composite material layer.

The top and bottom layers can be selected for aesthetic purposes, functional purposes, or many cases, both. The top foam layer 12 is intended to be in contact with the bottom surface of the foot, a sock on the foot, or an additional insole, so comfort, breathability, moisture wicking, insulation, and/or anti-microbial capability are important features when selecting the top foam layer 12. The bottom textile layer 14 is generally selected for aesthetic purposes, additional padding for comfort, and/or non-slip functionality to prevent the insole from slipping inside a shoe when in use.

FIG. 2 is a bottom view schematic outline of three embodiments of insoles, each with a different sized composite material layer 10 designed for different purposes as compared to the bottom surface of an example foot 22. Insole 2 depicts an embodiment where the composite material layer 10 spans from the backend of the heel to just before the ball of the foot (i.e. the heads of the metatarsals). Insole 4 represents an alternative design where the composite material layer 10 spans the portion of the foot extending from the backend of the heel to underneath the heads of the metatarsals, but does not extend the entire full length of the foot. Insole 6 is yet another embodiment where the composite material layer 10 spans the entire plantar, or bottom, surface of the foot.

Whether the performance insole is designed to provide support below the ball of the foot or not depends on the intended purpose of the performance insole. For example, insoles designed for running or hiking generally require sufficient flex below the heads of the metatarsals, and thus a rigid composite support layer that extends below the ball of the foot could be encumbering and restrict movement.

However, it can be beneficial for insoles designed for sports such as cycling, skiing, or hockey to have the rigid composite support layer extend below the ball of the foot. In these activities, the outer sole or bottom surface of the shoe, boot, or skate is generally very rigid, albeit sometimes for different reasons. For example, the sole of a cycling shoe can be designed to be very rigid (stiff) for performance reasons (i.e. increase load transfer to the pedal), whereas the bottom portion of a ski boot is rigid for functional integration into the binding on a ski. In any case, an activity where the sole of the footwear designed for that activity prevents or restricts flex of the foot, a supportive performance insole that spans beneath the ball of the foot can be beneficial. This type of insole design can provide a more uniform distribution of pressure on the bottom surface of the foot during these described activities.

In addition to the length of the supportive composite material layer 10 in the insole, the composite material layer 10 can be designed to have different fiber orientations, or fiber lay-ups, in different regions of the insole. The purpose of this would be to have different mechanical properties in different regions of the insole for tailored performance. FIGS. 3-6 illustrate different design features that can be incorporated into the composite laminate. The different regions in FIGS. 3-6 represent different laminate designs, which may include different fiber orientations and/or thicknesses. In some cases, the regions may represent areas where the reinforcement glass fibers of the composite material layer are removed to increase flex in the insole in a localized region or areas where an additional material is added, such as ethylene vinyl acetate (EVA) for polyurethane (PU) foam.

As an example, the design shown in FIG. 3 may include a $[+45°/-45°]_s$ fiber lay-up in regions 32 and 36 and a $[+45°/-45°/90°]_s$ fiber lay-up in region 34. The additional layers of 90° fibers will add additional flexural rigidity (stiffness) to region 34, but will also add additional thickness. In this particular example design, the 90° fibers can be removed from region 36 to reduce the thickness of the laminate under the heel where the additional stiffness is not beneficial and from region 32 for a more gradual and comfortable thickness transition at the front edge of the insole.

Figure 4:
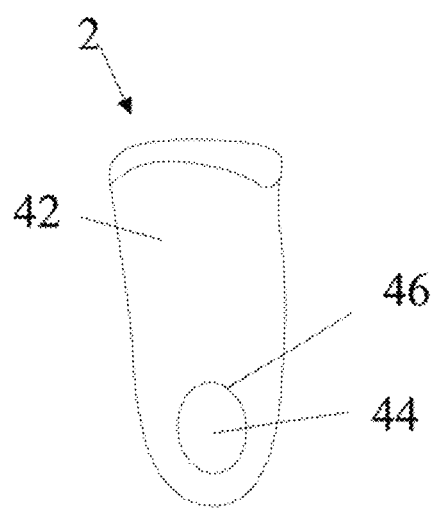
FIG. 4 is a top view schematic for one possible design of the different glass fiber layers that comprise the composite material layer.

FIG. 4 shows an alternative heel design than shown in FIG. 3. For this example, region 42 may be comprised of a $[+45°/-45°/90°]_s$ fiber lay-up and the heel region 44 could be comprised of a $[+45°/-45°]_s$ or a $[90°]$ fiber lay-up. Alternatively, heel region 44 could be comprised of no fibers, and instead include an additional padding material, such as EVA foam, polyurethane foam, or a gel. By removing the fibers from region 44, this design feature can also provide stability to the insole, much like a heel post. When the foot is pressed onto the insole during use in a shoe, the edge of the fibers 46 will create a flat region that will be in contact with midsole material of the shoe, thus the edge of the fibers 46 help stabilize the insole in the shoe.

For this embodiment shown in FIG. 4, the additional padding layer added to region 44 could be integrated into the insole by sandwiching the padding material between the top foam layer 12 and bottom textile layer 14, which could be done with no additional adhesive. As another alternative embodiment, the padding layer in region 44 could be added to the top or bottom surface of the fibers included in region 44.

Figure 5:
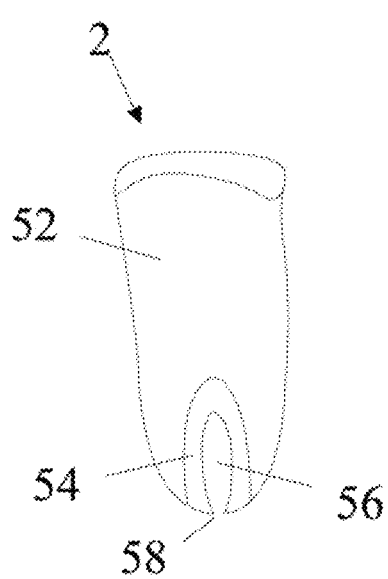
FIG. 5 is a top view schematic for one possible design of the different glass fiber layers that comprise the composite material layer.

FIG. 5 shows yet another alternative heel design. For this example, region 52 may be comprised of a $[+45°/-45°/90°]_s$ fiber lay-up, region 54 may include a $[+45°/-45°]_s$ fiber lay-up, and region 56 may include no fibers. The purpose of region 54 would be to transition the insole thickness from region 52 to region 56. By removing the reinforcement fibers in region 56 and including a separation 58 in the back portion of the heel region, this design would enable additional flexibility in the heel cup of the supportive insole 2, which could be beneficial for higher impact sports such as running.

Figure 6:
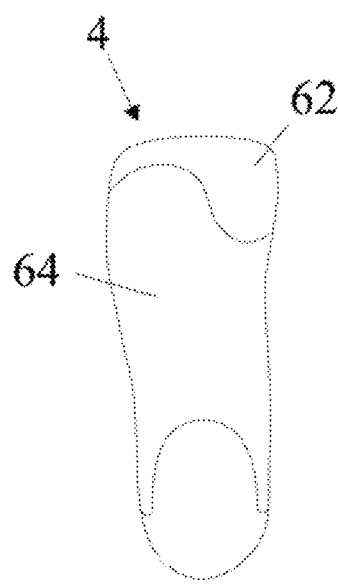
FIG. 6 is a top view schematic for one possible design of the different glass fiber layers that comprise the composite material layer.

FIG. 6 is a schematic of an example design for the longer supportive insole 4 intended to be used in footwear with rigid soles. For this exemplary design, region 64 may be comprised of a $[+45°/-45°/90°]_s$ fiber lay-up and region 62 may be comprised of a $[+45°/-45°]_s$ fiber lay-up. The purpose of this particular design for region 62 would be to reduce the thickness of the insole under the ball of the foot, which may be necessary for a comfortable fit when the insole is being worn inside certain select footwear.

Light-cured Composite Performance Sole with Integrated Traction Device

In the embodiments where the present invention includes a footwear device with a full length light-cured composite material layer that is integrated into a footwear article, the said footwear device will simply be referred to as a sole, and can be utilized as the outer sole of a footwear article.

Figure 7A:
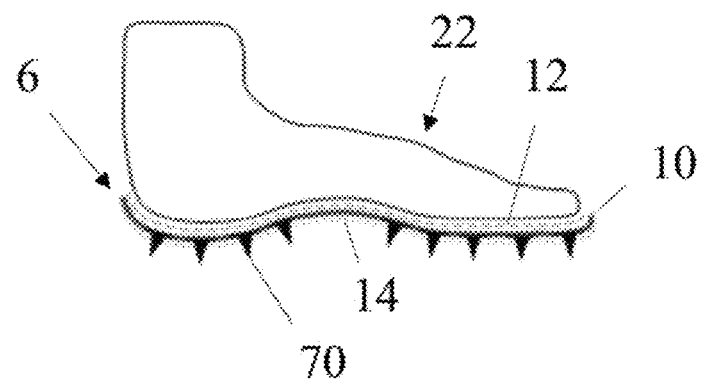
FIG. 7A is a side view cross-section schematic of the foot and the footwear device which includes a top foam layer, a light-cured composite material layer, a bottom textile layer, and multiple integrated traction devices.
Figure 7B:
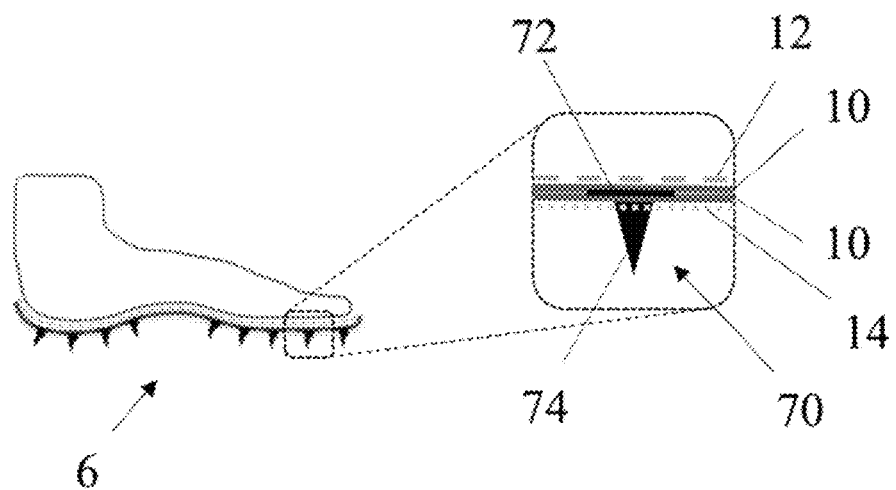
FIG. 7B is a close-up schematic representation of one embodiment of a traction device integrated into the composite material layer.

FIG. 7A and FIG. 7B schematically show one embodiment of the present invention that includes a footwear device intended to be used as a full-length sole in an article of footwear, where the full-length sole includes at least one integrated traction device 70.

FIG. 7B includes a close-up schematic of one example design for integrating the traction device 70 into a sole. As depicted in FIG. 7B, a top flat portion of the traction device 72 is sandwiched between at least two layers of reinforcement glass fibers that comprise the composite material layer 10. In this example, the top flat portion 72 of the traction device 70 is intended to increase the surface area with the reinforcement fibers to enhance bonding.

In addition, a portion of the traction device 74 that will ultimately provide traction protrudes through at least one of the fiber layers comprising the composite material layer 10 on the bottom surface of the sole.

The sole 6 schematically shown in FIG. 7A and FIG. 7B also includes a top foam layer 12 and a bottom textile layer 14 that are bonded to the composite material layer 10 with the same said light-cured polymer matrix.

Just as with the other embodiments, the layers of continuous glass fibers that form the composite material layer 10 can include unidirectional glass fiber layers, knitted glass fiber layers, or woven glass fiber layers, such as plain or satin weaves. In the preferred embodiment for a sole with a full length composite material layer 10 that includes integrated traction devices 70, continuous glass fibers would be used as the reinforcement phase in the composite material layer 10 and the continuous glass fibers would be layered to construct a symmetric laminate in at least a portion of the composite material layer 10.

In the preferred embodiment, the integrated traction device 70 would be made of a material adapted to bond to the light-cured resin during the curing process. The integrated traction device could be a polymer, metal, ceramic, or composites thereof.

Figure 8:
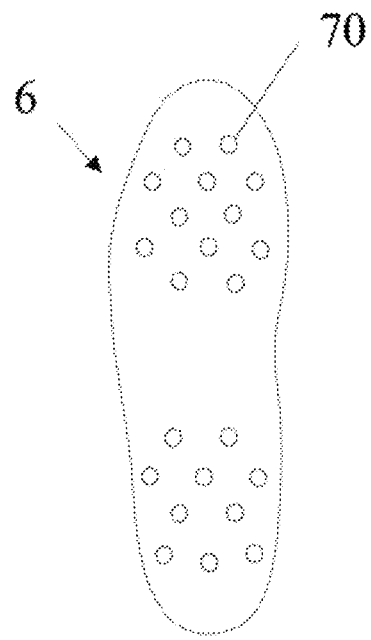
FIG. 8 is a top view schematic of the outer shape of the footwear device and notional placement of exemplary integrated traction devices.

FIG. 8 is one example of how the integrated traction devices 70 could be patterned over the area of the sole.

Figure 9:
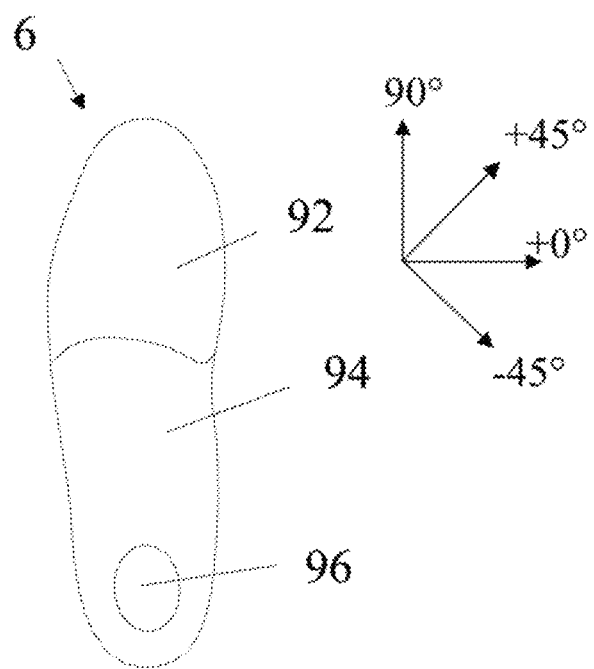
FIG. 9 is a top view schematic for one possible design for the regions of the full length composite material layer, where the composite plate design under the forefoot provides for some flexibility.

FIG. 9 is an alternative composite material layer design for a sole with a full-length composite plate 6 and integrated traction devices. The design shown in FIG. 9 may include a $[+45°/-45°]_s$ fiber lay-up in regions 92 and 96 and a $[+45°/-45°/90°]_s$ fiber lay-up in region 94. The additional layers of 90° fibers will add additional flexural rigidity (stiffness) to region 94, but will also add additional thickness. In this particular example design, the 90° fibers can be removed from region 96 to reduce the thickness of the laminate under the heel where the additional stiffness is not beneficial and from region 92 to decrease the thickness of the sole intended to be under the front portion of the foot.

An alternative design would be to have a $([+45°/-45°/90°/0°]_s$ fiber lay-up in region 94 and have a $[+45°/-45°/0°]_s$ lay-up in region 92 where the 0° fibers comprise at least half the total thickness of the laminate in region 92. This example laminate design for region 92 would enable some flex capability in the direction the foot would flex during use.

As yet another example, the heel region 96 could also include an additional padding material, such as EVA foam, polyurethane foam, or a gel.

Figure 10:
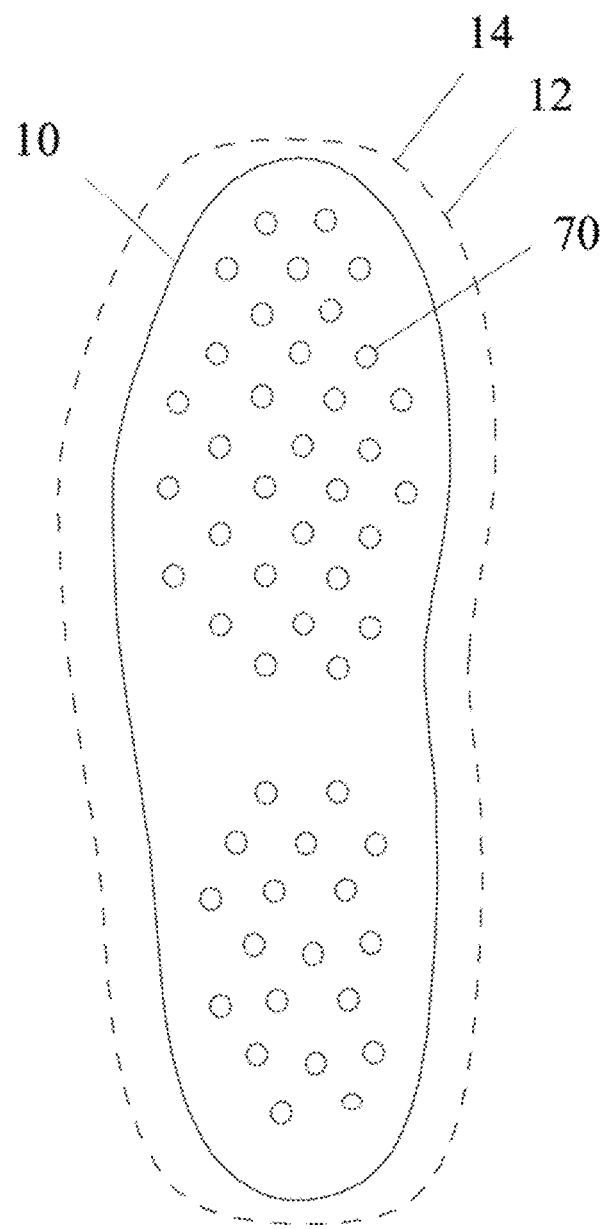
FIG. 10 is an example where the top foam or bottom textile layer is sized larger than the composite material layer in the full-length footwear device.

In some embodiments, it may be preferred to extend either the top foam layer 12 or bottom textile layer 14 or both beyond the outer dimensions of the composite material layer 10. This is schematically shown in FIG. 10. The additional material extending beyond the composite material layer could be designed to be incorporated as part of the upper of the shoe.

Methods to Fabricate Light-cured Composite Insoles Using Vacuum Press

Advancements of methods commonly used to create light-cured composites could be utilized to create the insole described in this invention. An example of a method described in the prior art for creating UV-cured composites is in the publication by Sunrez Corporation titled "Low Cost Manufacturing Processes using UV Cure Resins" presented at the Composites '97 Manufacturing & Tooling Conference.

Figure 11A:
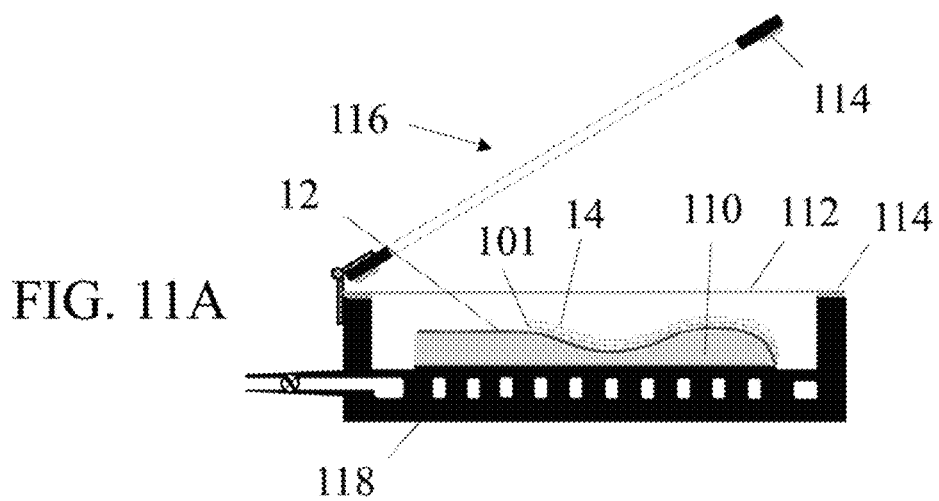
FIG. 11A is a schematic diagram of one system that could be used to shape the pre-cured insole assembly to the plantar surface of a foot mold.
Figure 11B:
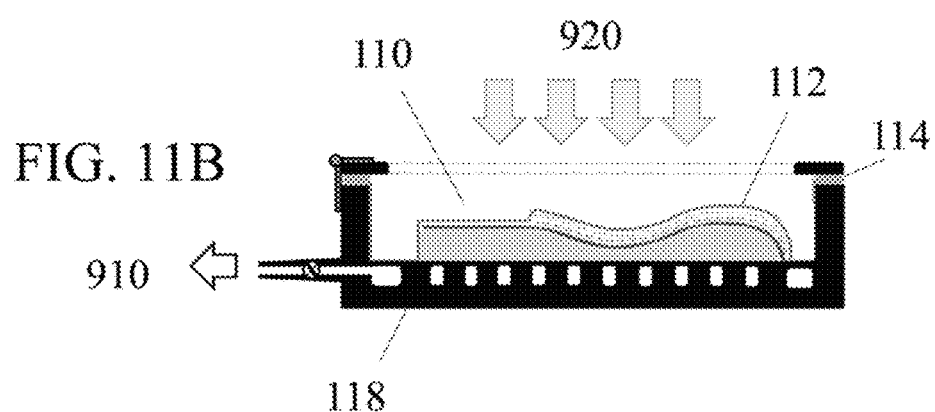
FIG. 11B is a schematic representation of one process that could be used to shape and cure the said footwear device using light.

FIG. 11A and FIG. 11B describe an embodiment that includes a vacuum table or vacuum press 118. The vacuum press 118 is adapted to pull vacuum on a transparent stretch film 112. The transparent stretch film 112 can be sealed between gasket material 114 that is on the vacuum table 118 and the lid 116 that secures to the vacuum table 118 before vacuum is applied. The lid 116 secures the transparent stretch film 112 around the perimeter of the vacuum table and is open in the center to enable light to be directed through the transparent stretch film 112.

A foot shaped mold 110 can be secured inside the vacuum press 118 and the layers that will comprise the insole; including the foam material 12, the pre-cured composite material layer 101 with uncured liquid resin, and the textile layer 14; can be placed over the foot mold 110 in the desired location and orientation. Once the lid 116 is secured, vacuum pressure 910 can be applied with a vacuum pump which causes the film to conform the pre-cured insole layers on the foot mold 110.

In one embodiment, the foot mold 110 comprises a computer controlled dynamic molding surface (similar to inFORM dynamic shape display developed by MIT Media Lab), where actuators control the shape of a flexible mold surface, such as silicone rubber. The actuators can be computer controlled to adjust the shape of the foot mold to accommodate different shapes that represent the plantar surface of a foot. This would enable the mold to change shape, when it is desired to manufacture different shaped insoles.

As vacuum pressure 910 is applied, the transparent stretch film 112 will press together the textile layer 14, the pre-cured composite material layer 101, and the foam layer 12, at which point, the light 920 can be directed at the vacuum table to transform the flexible pre-cured composite material layer 101 into the rigid composite material layer 10 and simultaneously bond the foam layer 12 and textile layer 14 to the composite material layer 10 creating a shaped insole.

In some embodiments, it may be preferable to include at least one thin polymer barrier layer for reasons described above.

Examples of materials used for transparent stretch films 112 include linear low-density polyethylene (LLDPE) or polyvinyl chloride (PVC) with a maximum elongation to failure greater than 100%.

For this described method, the source of light 920 may be selected to emit the appropriate wavelength range and intensity to cure the light-curable resin that bonds together all the layers of the insole and is the matrix holding together the glass fibers within the composite material layer.

The light used to cure the light-curable resin may emit in the UV or visible spectrum, or both, depending on the resin formulation. The light source may be LEDs, a mercury arc lamp, a fluorescent or halogen lamp, or even the sun.

One light option would be UV LEDs or low-cost UV fluorescent lamps that emit light in the wavelength range between 300-410 nm. The light curable resin may be formulated to cure by a cationic reaction or free-radical reaction. An example resin formulation that cures through a cationic reaction in this wavelength range would be an epoxy resin mixed with 3% Igracure PAG 290 by BASF. An example resin formulation that cures through a free-radical reaction would be an acrylate-based resin mixture with 0.5% Igracure 819 by BASF.

Figure 11C:
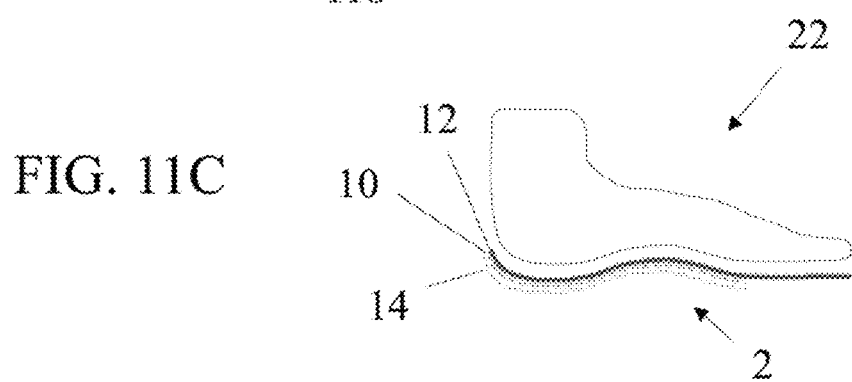
FIG. 11C is a schematic of the insole device after the composite material layer is cured into the shape of the plantar surface of the foot.

As mentioned above, the top foam layer 12 and bottom textile layer 14 are adapted to directly bond to the composite material layer during the curing process. If the top foam layer and bottom textile layer include a thin polymer barrier film, then film would be adapted to bond to the light-curable resin. Once the composite material layer 10 is cured, it will maintain the insole 2 in the shape of the bottom surface of the foot 22, as depicted in FIG. 11C.

One key aspect of this invention is that the shape of the insole is not defined by a compression molded or injection molded foam layer, which generally includes a variation in thickness to create and maintain the shape of an insole. For the insoles described in this invention, the top foam layer 12 is of substantially uniform thickness, and thus can be die cut in a flat shape from a large sheet of foam and does not require being compression or injection molded. This also enables the top foam layer to have a substantially uniform density, which would not be the case for a foam layer that is shaped by compression molding.

Methods to Fabricate Light-cured Composite Insoles Using Light Box System

The methods and system described in this section can be used to create a custom light-cured performance insole using a person's foot to define the shape of the said insole. The methods and system could also be adapted to work with a last having a desired foot shape.

Figure 12A:
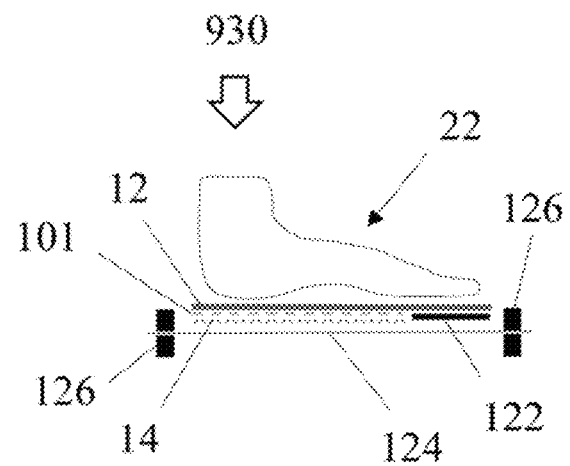
FIG. 12A is a schematic representation of the foot being pressed onto a foam layer, which is adjacent to a pre-cured composite material layer, which is adjacent to a textile layer, which is adjacent to a transparent stretch film layer.
Figure 12B:
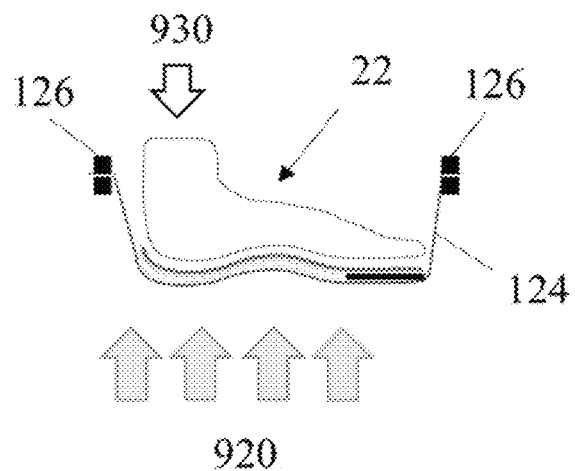
FIG. 12B is a schematic of the foam layer, composite material layer, and textile layer being exposed to light when conformed by the transparent stretch film to the plantar surface of the foot.

FIGS. 12A and 12B schematically describe one potential method for shaping the insole to an individual's foot shape 22. The method involves securing a transparent stretch film 124, at or near its perimeter, wherein the transparent stretch film is without substantial slack, or substantially taut, between the secured edges 126.

The method further involves placing a pre-cured insole assembly between the taut transparent stretch film and the plantar surface of a foot.

The method further involves pressing 930 the plantar surface of the foot against the pre-cured insole assembly such that the transparent stretch film 124 stretches between the secured edges 126 and conforms at least a portion of the pre-cured insole assembly to at least a portion of the plantar surface of the foot.

The method further involves exposing the pre-cured insole assembly to light, wherein the light has sufficient wavelength range and energy to cure the light-curable resin in the pre-cured insole assembly.

In one embodiment of the method, the plantar surface of the foot is pressed at least 25 mm through the plane that is defined by the edges securing the transparent stretch film. Or stated another way, the plantar surface of the foot is pressed through the plane defined by the substantially taut stretch film before the foot presses against the pre-cured insole assembly.

In some embodiments, it may be beneficial to press the foot farther, such as 75 mm, to improve conformability to the plantar surface of the foot.

In one embodiment, the top foam layer 12 is a full length foam material and the bottom textile layer 14 is a textile or other similar material that is sufficiently transparent to light. In one embodiment of this method, it may be beneficial to add an additional forefoot foam padding layer 122 and/or an additional heel foam padding layer.

The transparent stretch film 124 is adapted to stretch and conform the pre-cured insole layers to the bottom, or plantar surface of the foot 22 when the foot is pressed 930 onto the top layer 12, as shown in FIG. 12B.

An important aspect of the described method is ensuring a suitable transparent plastic stretch film 124 is used so the film can sufficiently stretch to conform the pre-cured insole to the bottom surface of the foot 22. Examples of materials used for transparent plastic films include linear low-density polyethylene (LLDPE) or polyvinyl chloride (PVC). An ideal transparent plastic film would have an elongation to failure greater than 300%; however, in some embodiments, it may be possible to use a transparent stretch film with 100% elongation to failure.

Generally speaking, as the thickness of a film increases, the force required to stretch the film increases; and hence a greater pressure 930 would be required to stretch the film. Depending on the size of the foot and pressure desired, the stretch film thickness could range from 30 gauge (0.008 mm) to 200 gauge (0.05 mm).

In some embodiments, an 80 gauge (0.02 mm) LLDPE transparent plastic film can stretch and provide good conformability of the pre-cured insole to the bottom surface of the foot without altering the shape of the foot. In some cases, it may be beneficial to use a thicker gauge film, such as 120 gauge (0.03 mm) or 150 gauge (0.04 mm), to provide greater conforming pressure.

In the embodiment where the plantar surface of a person's foot is used to press the pre-cured insole assembly onto the transparent stretch film, it is possible to have the person sitting, such that they are not applying their full weight to their feet. This again leads to the importance of selecting the proper gauge of stretch film. If the film is too thick, the person will not be able to reasonably press their foot with enough pressure to conform the pre-cured insole assembly to the plantar surface of their foot using the described method.

In the embodiment where the person is standing and applying their weight when pressing their foot onto the pre-cured insole assembly, it may be desirable to use a thicker transparent stretch film, such as 200 gauge (0.05 mm).

Once the foot 22 is pressed onto the stretch film 124 and the pre-cured insole assembly is sufficiently conformed to the bottom surface of the foot, light 920 is directed at the pre-cured insole layers to cure the pre-cured composite material layer 101, resulting in a shaped, rigid composite material layer.

The compaction pressure caused by stretching of the transparent film 124 helps improve the mechanical properties of the final composite insole by forcing out excess resin and voids before curing the composite material. The excess resin may go into the top foam layer 12 or the bottom textile layer 14, and can aid in bonding these layers to the light-curable composite material layer 10. In the embodiments where a thin polymer barrier film is used, the resin would bond to the barrier film, as opposed to the top foam layer or textile layer. This compaction pressure will lead to an optimum volume ratio of the fibers and resin that comprise the composite material layer. In the preferred embodiment, the volume percent of fibers within the composite material layer would be greater than 50%. In some embodiments, the volume percent of fibers in the composite material layer would be greater than 30%.

As with the described method that utilizes a vacuum table, the light used to cure the light-curable resin may emit in the UV or visible spectrum, or both, depending on the resin formulation. The light source may be LEDs, a mercury arc lamp, a fluorescent or halogen lamp, or even the sun.

In one preferred embodiment, UV LEDs or low-cost UV fluorescent lamps are used that emit light in the wavelength range between 300-410 nm.

The light curable resin may be formulated to cure by a cationic reaction or free-radical reaction.

In some embodiments, visible light with a wavelength range above 410 nm could be utilized and the photoinitiator used in the resin formulation could be selected accordingly.

As mentioned above, the top foam layer and bottom textile layer—with or without a thin polymer barrier layer—can be adapted to directly bond to the composite material layer during the curing process. The advantage of this is that the top and bottom surface of the insole can be lined or covered with a material that is substantially different than the fiber reinforced composite material layer without requiring a separate manufacturing step to bond the additional layers to the insole.

Figure 12C:
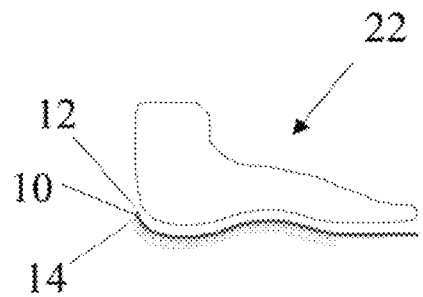
FIG. 12C is a schematic of the insole device after the composite material layer is cured into the shape of the plantar surface of the foot.

Once the composite material layer is cured, it will maintain the insole 2 in the shape of the bottom surface of the foot 22, as depicted in FIG. 12C.

The embodiment described by FIGS. 12A-12C, is one embodiment where the relative motion of the foot causes the transparent stretch film to conform the pre-cured insole assembly to the plantar surface of the foot. This embodiment does not preclude other variations of this invention where there the foot is held substantially stationary and relative motion of the transparent stretch film leads to the same result, in that the transparent stretch film conforms the pre-cured insole assembly to the plantar surface of the foot.

Figure 13A:
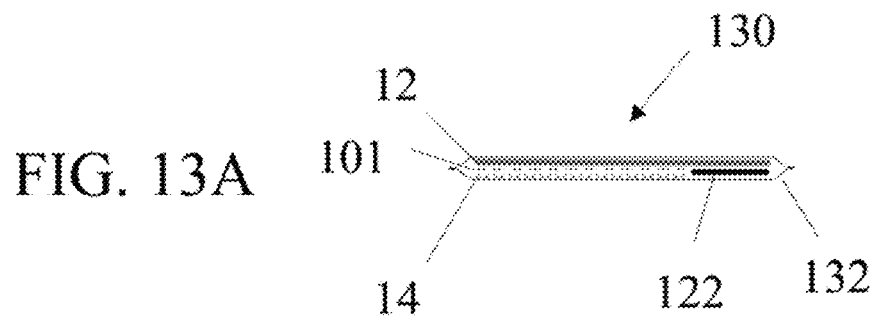
FIG. 13A is a side view cross-section schematic of flat packaged, pre-cured insole assembly that includes a full-length top foam layer, light-curable pre-cured composite material layer, bottom textile layer, and additional forefoot foam layer, all sealed in a transparent flexible film.
Figure 13B:
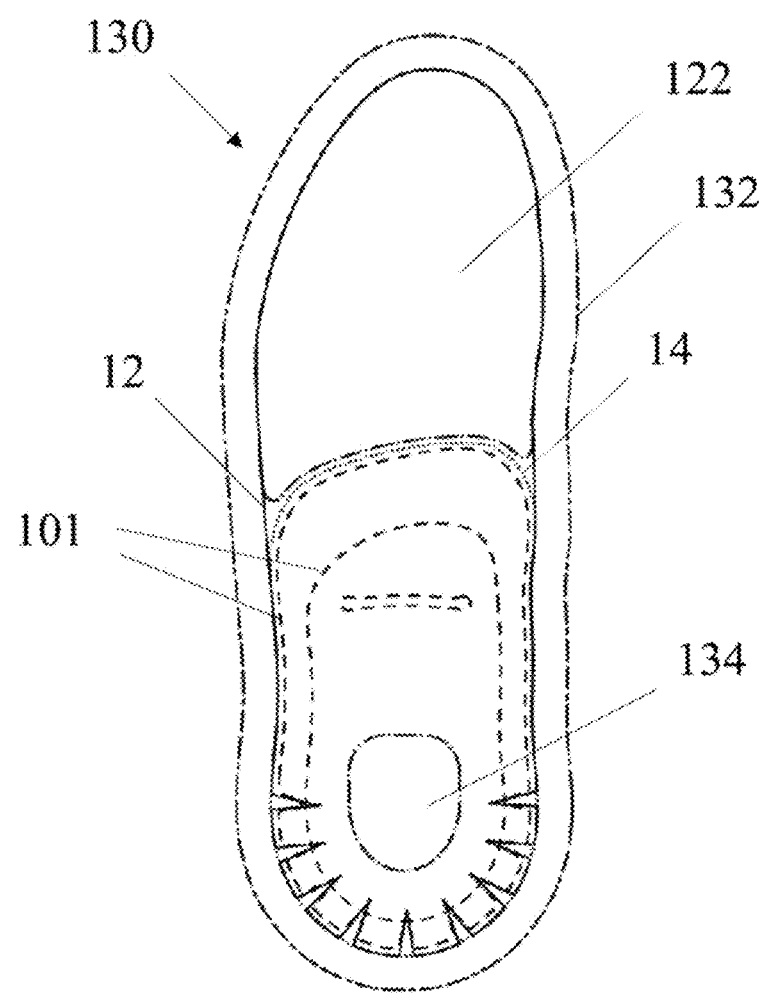
FIG. 13B is a top view cross-section schematic of flat packaged, pre-cured insole assembly that includes a full-length top foam layer, light-curable pre-cured composite material layer, bottom textile layer, and additional forefoot and heel foam layers, all sealed in a transparent flexible film.

FIG. 13A and FIG. 13B represent a side view cross-section schematic and a top view wireframe schematic, respectively, of a packaged, pre-cured insole assembly. Pre-cured insole assemblies can be made in different sizes to accommodate different foot sizes.

The pre-cured insole assembly 130 includes a top foam layer 12, a pre-cured composite material layer 101, a bottom textile layer 14, and an optional forefoot padding layer 122. Also shown in FIG. 13B, is an addition heel padding layer 134. The pre-cured insole assembly may also include one or more thin polymer barrier layers between or adjacent to one of the aforementioned layers.

All the described layers of materials are packaged and sealed in a thin flexible packaging film 132, whereas the thin flexible packaging film is sufficiently transparent to light on the bottom surface of the pre-cured insole assembly 130. Sealing the different layers in a thin flexible film 132 keeps the layers together in their relative desired location prior to curing the insole and also prevents leakage or loss of the light-curable liquid resin that has been impregnated into the fibers to create the pre-cured composite material layer 101.

The transparent, thin flexible packaging film 132 used for packaging the pre-cured insole assembly 130 needs to be robust enough to survive shipping and handling, but not too thick such that it would prevent conformability of the pre-cured insole assembly to the bottom surface of the foot. A thin polyethylene film, for example 0.7 mils thick, provides a good balance of flexibility and robustness.

Figure 14A:
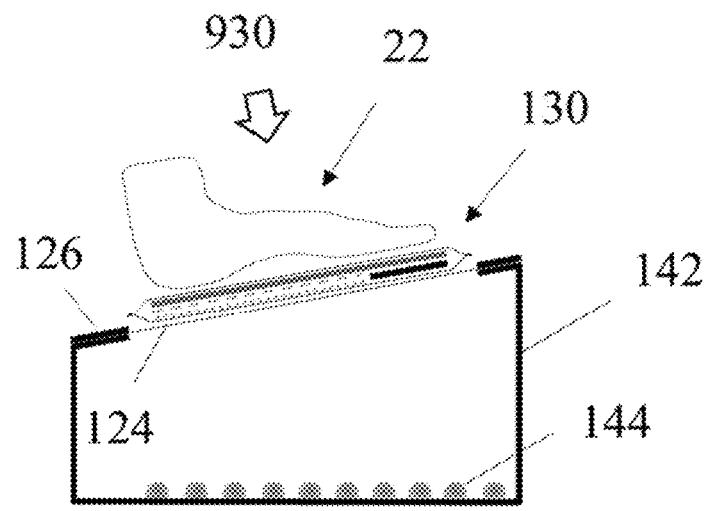
FIG. 14A is a schematic representation of the system that includes a light box adapted to secure a transparent stretch film such that the foot can press the packaged, pre-cured insole assembly onto the film to conform the pre-cured insole the plantar surface of the foot.
Figure 14B:
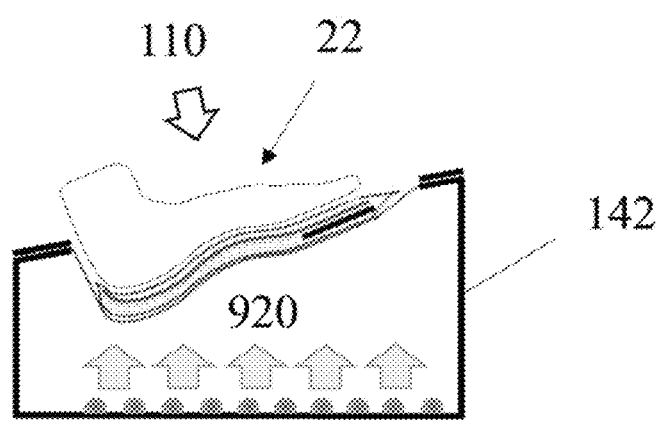
FIG. 14B is a schematic representation of the light box being used to expose the pre-cured insole assembly to light when the packaged, pre-cured insole assembly is conformed to the plantar surface of the foot by the transparent stretch film.

FIG. 14A and FIG. 14B describe a system to create a custom insole or orthotic by directly molding a pre-cured insole assembly to the plantar surface of a foot. The system includes a light box 142 configured to secure a thin transparent stretch film 124 taut over an opening on one surface of the light box, as depicted in FIG. 14A. The transparent stretch film is secured around all or a portion of the edges 126 of the opening in the light box.

In some embodiments, the transparent stretch film 124 may be secured around the edges 126 of the opening in the light box by sandwiching the stretch film between the light box and a lid or frame, as shown in FIGS. 14A and 14B.

In some embodiments, the transparent stretch film 124 may be tacky or clingy enough as to secure itself to the light box material around the edges of the open area of the light box. This would eliminate the need for a frame to secure the transparent stretch film substantially taut over the opening in the light box.

The opening on the light box, over which the taut transparent stretch film is secured, is adapted to fit the pre-cured insole assembly 130 and allow for motion of the foot into the light box. In one embodiment, the light box may include an optional removable frame intended to change the size of the opening in the light box that the foot is pressed through. In another embodiment, the plastic stretch film comes pre-attached to the frame. In yet another embodiment, the plastic transparent stretch film is drawn over the light box from a roll attached or adjacent to the light box.

The light box 142 is configured such that the edges of the stretch film are constrained and there is sufficient open volume below the plastic stretch film 124, so that the foot has enough range of motion to press the pre-cured insole assembly into the light box, such that the transparent stretch film stretches and conforms the pre-cured insole assembly to the bottom surface of the foot.

The light box includes a light source 144 that is adapted to cure the pre-cured composite material layer when the pre-cured insole assembly is conformed to the foot by the transparent plastic stretch film. In the preferred embodiment, the light source 144 is an array of UV-LEDs configured to emit at a wavelength between 350-410 nm. However, other light sources adapted to cure the light-curable resin, such as low-cost UV fluorescent bulbs may also be used.

Figure 15A:
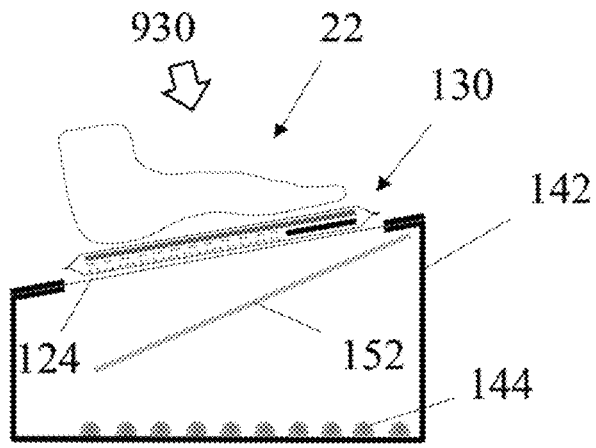
FIG. 15A is a schematic representation of a light box that includes a transparent guide plate for controlling the depth of the foot that is pressed into the light box prior to exposing the pre-cured insole assembly to light.
Figure 15B:
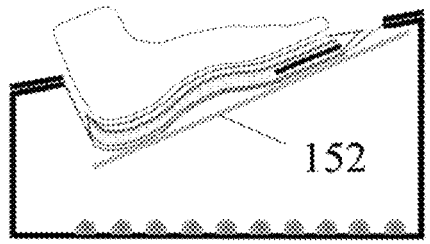
FIG. 15B is a schematic representation of the pre-cured insole assembly being conformed by the transparent stretch film to the plantar surface of the foot and the plantar surface of the foot is adjacent the transparent guide plate.

In one embodiment of the described system, shown in FIGS. 15A and 15B, the light box 142 includes a transparent guide plate 152 that is used to help ensure the foot is pressed into the light box at a sufficient depth to achieve good conformability of the pre-cured insole assembly 130 to the bottom surface of the foot 22, without pressing the foot too far into the light box. If the foot is pressed too far into the light box, the stretch film 124 may surpass its maximum elongation capability and tear. The transparent guide plate also prevents the foot from coming in contact with the light source 144 at the bottom of the light box. However, the transparent guide plate is not intended to conform the pre-cured insole assembly to the bottom surface of the foot.

In one embodiment, at least a portion of the transparent guide plate is at least 25 mm from the plane that is defined by the open area on the one surface of the light box over which the transparent stretch film is secured.

In one embodiment, the transparent guide plate is not parallel to the plane that is defined by the open area on the one surface of the light box over which the transparent stretch film is secured. This embodiment is depicted in FIG. 15A.

Figure 17A:
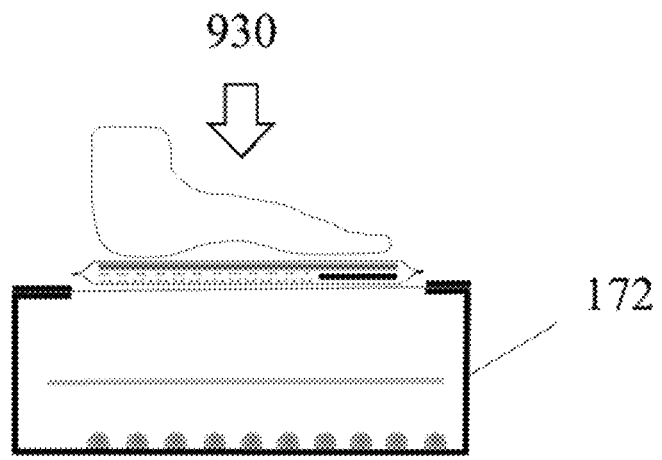
FIG. 17A is a schematic representation of a light box that includes a transparent guide plate for controlling the depth of the foot that is pressed into the light box prior to exposing the pre-cured insole assembly to light.

In one embodiment, the transparent guide plate is parallel to the plane that is defined by the open area on the one surface of the light box over which the transparent stretch film is secured. This embodiment is depicted in FIG. 17A.

In one embodiment of the described system, the transparent guide plate is adjustable within the light box. For example the transparent guide plate height could be adjusted so it is possible to adjust how far the foot is pressed into the light box, for example, from 25 mm to over 100 mm. The angle of the transparent guide plate could also be adjusted to control the foot angle when fabricating the insole. Another embodiment may include other, nonplanar features on the transparent guide plate for specific positioning of the foot before the pre-cured insole assembly is exposed to light and cured into a shaped insole or orthotic.

Figure 16:
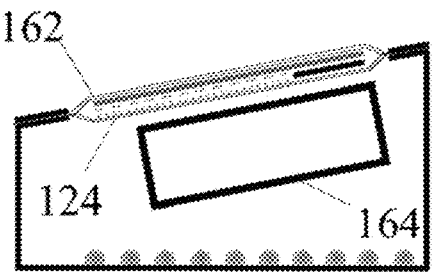
FIG. 16 is a schematic representation of the light box with access windows to enable positioning of the foot by hand before exposure to light.

FIG. 16 describes two additional embodiments of the system. In one embodiment, a second stretch film 162 is placed over the pre-cured insole assembly, such that the pre-cured insole assembly is sandwiched between the bottom film layer 124 and the top film layer 162. One advantage of this embodiment is that the top stretch film layer can be adapted to prevent transmission of UV light, providing an additional safety measure for anyone looking into the light box when the light source is on.

An additional embodiment shown in FIG. 16 is a light box with an opening 164 on one or both sides of the light box. The opening 164 can be used to provide access to the foot when the foot is pressed into the light box. This feature may be beneficial for medical professionals and other foot experts that may want to manipulate the position of the foot and/or the pre-cured insole assembly before curing the insole into shape.

Figure 17B:
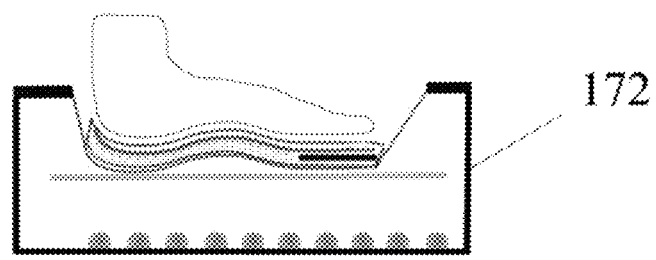
FIG. 17B is a schematic representation of the pre-cured insole assembly being conformed by the transparent stretch film to the plantar surface of the foot and the plantar surface of the foot is adjacent the transparent guide plate.

FIG. 17A and FIG. 17B schematically show a light box 172 that has a rectangular shape, where the surface of the light box that is adapted to hold or constrain the transparent stretch film taut is parallel to the bottom surface. Depending on the positioning requirement, it may be desirable to have a light box with a flat top, as shown in FIG. 17A and FIG. 17B. Alternatively, it may be desirable to have an angled top surface of the light box, as shown in FIG. 15A. The two example light box shapes shown herein, should be considered example representations of this invention, and not limited to other light box designs.

Figure 18A:
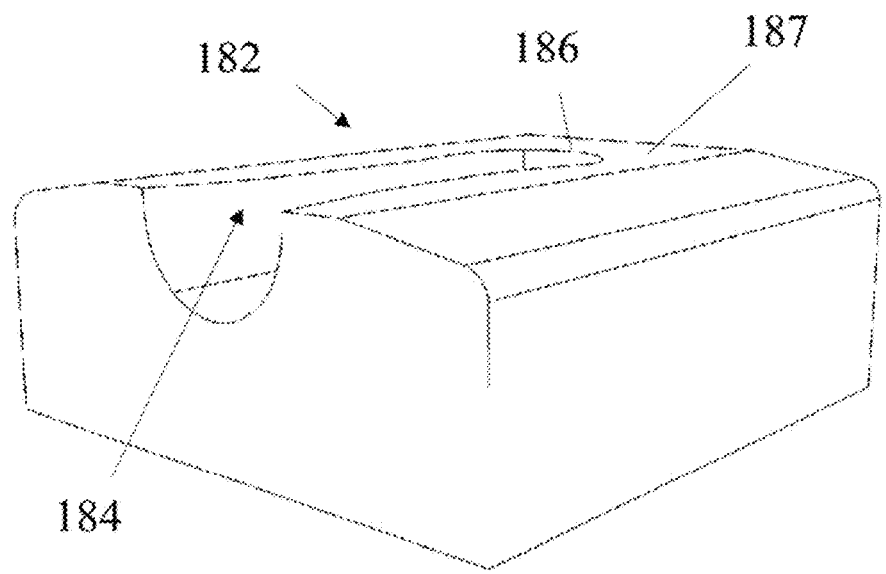
FIG. 18A is an angled view of one embodiment of a light box.

FIG. 18A is an angled view of an embodiment of a light box. The open area 184 on one surface of the light box 182 is a representative shape of the area over which the transparent film would be secured or constrained. In this embodiment, the transparent stretch film would be supported substantially flat over the open area 184 and secured at the edges of the open area 186 of the light box 182. In this embodiment, the transparent stretch film would cling or stick to the top surface of the light box 187, such as the transparent stretch film would only stretch between the edges 186 when the foot is pressed through open area 184.

Figure 18B:
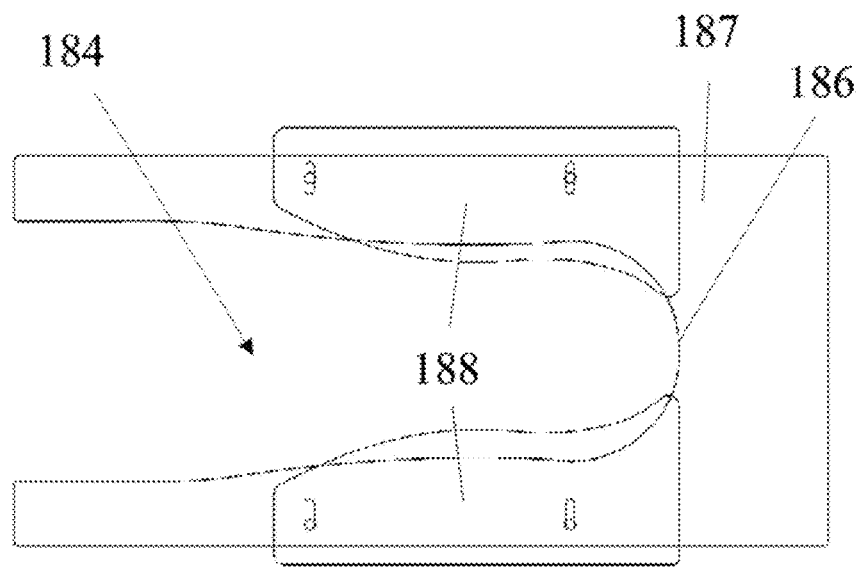
FIG. 18B is a top view schematic of one embodiment of the open area on one surface of the light box that includes sliders to adjust the size of the open area over which the transparent stretch film is secured.

FIG. 18B is a top view representative shape of the open area 184 in the light box. FIG. 18B also includes adjustable sliders 188 that enable easy adjustment to the shape of the open area 184 before the transparent stretch film is applied over surface 187 and secured at the edges of the open area 186. The adjustable sliders 188 allow a user to easily adjust the size of the open area to accommodate for different foot widths.

An opening that is slightly larger than the foot width (~5-20 mm) provides better conformation of the pre-cured insole assembly to the plantar surface of the foot as the foot is pressed into the light box. However, if the open area is too narrow, the motion of the foot could be obstructed by the adjustable sliders or the transparent stretch film could tear.

Additional embodiments of the described system could include a light box with actuators that are designed to move the transparent stretch film against a relatively stationary plantar surface of the foot, thus causing the transparent stretch film to conform the pre-cured insole assembly to the plantar surface of the foot.

As described above, this invention includes the embodiment where the plantar surface of the foot is moved relative to the transparent stretch film, and the embodiment where the transparent stretch film is moved relative to the foot. In both cases, the transparent stretch film stretches and conforms the pre-cured insole assembly to the plantar surface of the foot.

For the described embodiments of this invention, the local thickness of the light-cured insole, that is, the thickness at any particular point on the insole, is substantially similar to the local thickness of the pre-cured insole assembly under approximately equal pressure. The thickness over the area of the insole can change by designing different laminate thicknesses, as shown in FIG. 3-6, or for example, adding additional foam layers, but the conformability of the pre-cured insole assembly to the foot prior to exposure to light does not rely on flow of resin in a bladder to compensate for a variation between the bottom surface of the foot and a rigid surface, as described by Lyden in the prior art. In this invention, conformability is achieved by using a flexible transparent stretch film to conform the flexible pre-cured insole assembly to the bottom surface of the foot.

In a preferred embodiment of this invention, the total thickness of the insole can generally vary between <1 mm to 6 mm; however, the thickness variations do not substantially change the conformability to the foot surface, but rather the resulting properties of the final insole. For example, regions on the insole with thicker foam will provide more localized padding, whereas, regions with a thicker composite laminate will provide increased stiffness and strength.

One major difference between this invention and prior art, such as U.S. Pat. Nos. 5,632,057 and 6,939,502 by Lyden, is that the methods and system described in this invention do not utilize or require a rigid mold or surface and a conformable bladder to define the shape of the light-cured insole. In this invention, the shape of the light-cured insole is created by using a transparent plastic stretch film to stretch and conform the pre-cured insole assembly to the bottom, or plantar surface of the foot.

In the prior art by Lyden, the pre-cured light-curable material is designed to conform a bladder of UV-curable material and fill the volume between the bottom surface of a foot and either a hard flat surface (U.S. Pat. No. 5,632,057) or a hard, generic foot-shaped tooling surface (U.S. Pat. No. 6,939,502). Although using a hard tool in the shape of generic foot surface will reduce the thickness variation of the resulting light-cured insole in comparison with using a flat surface (U.S. Pat. No. 5,632,057), both methods taught by Lyden still rely on flow and displacement of the light-curable material in a bladder to conform the material to the bottom surface of the foot when the foot is pressed against a hard tooling surface.

Additional relevant prior art include U.S. Pat. Nos. 6,490,730, 6,681,403, and 7,003,803, all by Lyden. In this prior art, Lyden describes light-cured articles of protective equipment and methods to fabricate the articles directly on the relevant area of the body. However, in the prior art, Lyden does not teach a method or system that includes a transparent stretch film that is stretched to conform the pre-cured materials to the relevant area of the body. Lyden does teach a method where a pre-cured shin guard is held against the body by a thin sleeve (see FIG. 59 and FIG. 60 in U.S. Pat. No. 7,003,803); but the prior art does not teach or fairly suggest conformation of the material to the surface of the body by stretching a transparent stretch film. There are two main disadvantages related to this prior art that the current invention improves upon.

The first disadvantage of using a sock or sleeve to conform a light-curable material to the plantar surface of a foot is that the sock would require being pulled over the foot while maintaining the desired position of the light-curable material against the plantar surface of the foot. This method is both difficult and cumbersome. The second disadvantage is that it is not possible to quickly remove the plantar surface of the foot from close contact with the curing material while the material is being cured.

It is known to those skilled in the art that UV-cured resins can be very exothermic during curing. Therefore, as a safety precaution, it is desirable to be able to quickly remove a person's foot (or other body part) during the curing process in case the resin heats up too much for the person during the curing process. By utilizing a transparent stretch film as described in this invention, it is easy to separate the foot from contact with the pre-cured insole assembly during the curing process.

In some embodiments where the desired shape of the insole requires a relatively large change in surface area between the flat materials (for example, the flat foam material or the flat glass fiber layers that are the reinforcement in the composite material layer) and the shaped insole, it may be necessary to remove material from one or more of the insole layers to ensure the flat materials do not wrinkle when shaped into the desired shape of the insole. This can be particularly important to enable a shaped insole with a deep heel cup or a narrow insole with a high arch.

Figure 19A:
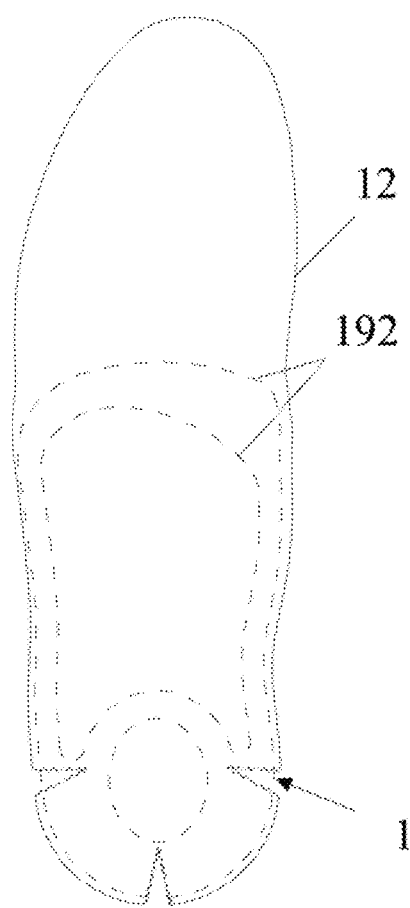
FIG. 19A is a top view schematic of the foam layer and the fiber layers that comprise the composite material layer, where the foam layer includes cutouts to enable the pre-cured insole assembly to conform to the curvature of the foot without wrinkling.
Figure 19B:
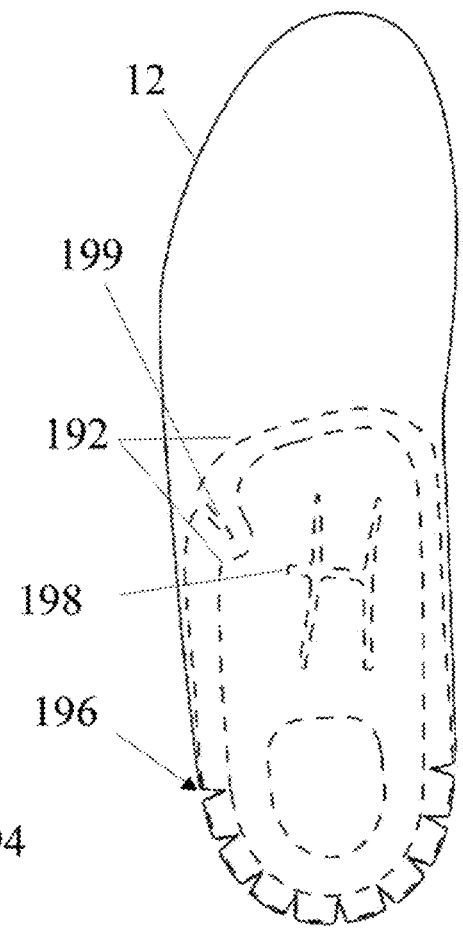
FIG. 19B is a top view schematic of the foam layer and the fiber layers that comprise the composite material layer, where the foam layer and fiber layers include cutouts to enable localized flexibility and improve conformation to the complex curvature of the plantar surface of the foot without wrinkling.

FIG. 19A and FIG. 19B are top view schematics representing two possible, general designs for the shape of the top foam layer 12 and glass fiber reinforcement layers 192 that are incorporated into the pre-cured composite material layer. To achieve good conformability around the heel, or other areas of complex curvature, it may be necessary to remove a portion of the top foam material and/or the glass fiber reinforcement layers 192, such that areas of high curvature can be formed without the top layer foam and/or glass fiber reinforcement layers wrinkling. The zipper design 194 shown in FIG. 19A is one example design that enables a flat top foam material and reinforcement fiber layers to conform into a deep, heel cup shape without wrinkling. FIG. 19B is another example design where the cutouts 196 in the top foam layer and fiber layers are smaller, but closer spaced that the zipper design 194. The example design shown in FIG. 19B also includes cutouts 198 that remove material from the glass fiber reinforcement layers 192. Cutout 198 of the glass fibers in the arch area helps prevent microbuckling of the glass fiber layers as the flat pre-cured composite material layer is shaped to the plantar surface of a foot or foot mold.

In addition to improving conformability of the pre-cured composite material layer, cutout sections in the reinforcement fibers can also provide localized flexibility. The "H" cutout design 198 is an example that provides additional flexibility in the composite material layer under the plantar fascia. Cutout 199 provides additional flexibility in the lateral arch support after the composite material layer is cured to the shape of the plantar surface of the foot.

In most cases the bottom textile layer is very thin and can be adapted to conform to large changes in curvature without wrinkling, and therefore, this layer generally does not need material removed to avoid wrinkling when the pre-cured insole assembly is shaped to the plantar surface of a foot or foot mold.

In one embodiment, the pre-cured insole assembly can be pre-shaped into a generic foot shape. In this embodiment, the pre-shaped, pre-cured insole assembly includes a shaped top layer, such as an EVA foam layer, that has a defined heel cup and arch shape. This pre-shaped, pre-cured insole assembly can then be used in the aforementioned system to conform the shape to the exact shape of the foot.

Other embodiments that utilize a transparent stretch film or other flexible non-rigid materials to conform a pre-cured insole assembly to the foot should be considered embodiments of this invention.

While this invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof. This includes embodiments that may utilized the described system and methods to create other shaped, light-cured parts such as braces or casts that are shaped to different parts of the body other than the plantar surface of the foot.

What is claimed is:

1. A system for making a shaped footwear device, the said system comprising:
   a light box configured to hold a transparent stretch film substantially taut over an opening on one surface of the light box;
   wherein the transparent stretch film is secured near at least a portion of the edges of the opening on the one surface of the light box;
   a pre-cured insole assembly;

wherein, the pre-cured insole assembly is adapted to fit within the opening on the one surface of the light box;

wherein the light box includes at least one light source adapted to direct light on at least one surface of the pre-cured insole assembly;

wherein the light from the light source is adapted to cure the light-curable resin in the pre-cured insole assembly; and wherein an open volume exists directly below the transparent stretch film when taut, the open volume being of a depth to accommodate the pre-cured insole assembly when pressed into the transparent stretch film and through the opening.

2. The system of claim 1, wherein, the maximum elongation to failure of the transparent stretch film is at least 100%.

3. The system of claim 1, wherein, the pre-cured insole assembly comprises stacked layers;

wherein, the stacked layers comprise at least one foam layer, at least one pre-cured composite material layer, and at least one textile layer.

4. The system of claim 3, wherein the stacked layers comprise a polymer film barrier layer between the at least one pre-cured composite material layer and the at least one foam layer.

5. The system of claim 3, wherein the stacked layers comprise a polymer film barrier layer that is adjacent to at least one surface of the at least one textile layer.

6. The system of claim 3, wherein, the pre-cured insole assembly comprises a thin, transparent, flexible packaging film around the outer surface of the stacked layers.

7. The system of claim 3, wherein the at least one composite material layer comprises at least one layer of continuous glass fibers that are woven, stitched, or knitted.

8. The system of claim 3, wherein the at least one textile layer has greater than 20% transmittance to light within a wavelength range between 370nm and 410 nm.

9. The system of claim 1, wherein the thickness of the transparent stretch film is between 0.008 mm and 0.05 mm.

10. The system of claim 1, wherein the light box comprises a transparent guide plate secured between the opening on one surface of the light box and the light source, wherein at least a portion of the transparent guide plate is at least 25 mm from the opening on the one surface of the light box.

11. The system of claim 3, wherein the transparent guide plate is adjustable and can be set at different angles and positions within the light box.

12. The system of claim 1, wherein the size of the opening on the one surface of the light box is adjustable.

13. The system of claim 1, wherein the light box includes access windows such that there is access to adjust the position of the foot and pre-cured insole assembly by hand.

14. A system for making a shaped footwear device, the said system comprising:

a light box configured to hold a transparent stretch film substantially taut over an opening on one surface of the light box;

wherein the transparent stretch film is secured near at least a portion of the edges of the opening on the one surface of the light box;

a pre-cured insole assembly;

wherein, the pre-cured insole assembly is adapted to fit within the opening on the one surface of the light, box;

wherein the light box includes at least one light source adapted to direct light on at least one surface of the pre-cured insole assembly;

wherein the light from the light source is adapted to cure the light-curable resin in the pre-cured insole assembly; and wherein the light box comprises a transparent guide plate secured between the opening on the one surface of the light box and the light source, the transparent guide plate positioned below the transparent stretch film such that an open volume exists between the transparent guide plate and the transparent stretch film, with the transparent guide plate being at least 25 millimeters from the transparent stretch film that is between the edges of the opening on the one surface of the light box.

15. A system for making a shaped footwear device, the said system comprising:

a light box with an opening on one surface of the light box;

a transparent stretch film;

wherein the transparent stretch film is covering at least a portion of the opening on the one surface of the light box;

wherein there is no rigid material within 25 mm directly below the transparent stretch film that is between the edges of the opening on the one surface of the light box;

a pre-cured insole assembly;

wherein, the pre-cured insole assembly is adapted to fit within the opening on the one surface of the light box;

wherein the light box includes at least one light source adapted to direct light on at least one surface of the pre-cured insole assembly; and wherein the light from the light source is adapted to cure the light-curable resin in the pre-cured insole assembly.

* * * * *